(12) United States Patent
Knigge et al.

(10) Patent No.: US 8,139,309 B2
(45) Date of Patent: Mar. 20, 2012

(54) NEGATIVE BIASING A SLIDER WITH RESPECT TO A DISK TO REDUCE SLIDER WEAR AND PROVIDE BURNISH RATE CONTROL

(75) Inventors: Bernhard E. Knigge, San Jose, CA (US); Bruno Marchon, Palo Alto, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/646,931

(22) Filed: Dec. 23, 2009

(65) Prior Publication Data

US 2011/0157739 A1   Jun. 30, 2011

(51) Int. Cl.
*G11B 21/02* (2006.01)
(52) U.S. Cl. .......................................................... 360/75
(58) Field of Classification Search .................. None
See application file for complete search history.

(56) References Cited

U.S. PATENT DOCUMENTS

| | | | |
|---|---|---|---|
| 5,696,643 A | 12/1997 | Tsuwako et al. | |
| 6,359,746 B1 | 3/2002 | Kakekado et al. | |
| 6,366,416 B1 | 4/2002 | Meyer et al. | |
| 6,577,466 B2 | 6/2003 | Meyer et al. | |
| 6,852,013 B2 | 2/2005 | Smith | |
| 7,016,139 B2 | 3/2006 | Baumgart et al. | |
| 7,126,777 B2 * | 10/2006 | Flechsig et al. | 360/59 |
| 7,199,960 B1 | 4/2007 | Schreck et al. | |
| 7,233,451 B2 | 6/2007 | Baumgart et al. | |
| 7,362,533 B2 * | 4/2008 | Stipe | 360/75 |
| 7,450,333 B2 | 11/2008 | Hirano et al. | |
| 7,489,466 B2 * | 2/2009 | Knigge et al. | 360/75 |
| 7,495,856 B2 * | 2/2009 | Payne et al. | 360/75 |
| 2005/0174665 A1 | 8/2005 | Zhang et al. | |
| 2008/0259480 A1 | 10/2008 | Pham et al. | |

FOREIGN PATENT DOCUMENTS

| | | |
|---|---|---|
| JP | 61151839 | 7/1986 |
| JP | 61156525 | 7/1986 |
| JP | 62184679 | 8/1987 |
| JP | 1013210 | 1/1989 |
| JP | 5135359 | 6/1993 |

* cited by examiner

*Primary Examiner* — K. Wong

(57) ABSTRACT

In a method for negatively biasing a slider with respect to a disk to reduce slider wear and provide burnish rate control a negative bias voltage is generated between the slider and the disk surface respectively, the negative bias voltage causing slider/disk contact wear to occur on the disk instead of on the slider.

20 Claims, 6 Drawing Sheets

400

GENERATE A NEGATIVE VOLTAGE BIAS BETWEEN THE SLIDER AND THE DISK SURFACE RESPECTIVELY, THE NEGATIVE BIAS VOLTAGE CAUSING SLIDER/DISK CONTACT WEAR TO OCCUR ON THE DISK INSTEAD OF ON THE SLIDER.
410

UPON DETECTING A DISK SURFACE DEFECT, PROVIDING A INCREASED VOLTAGE PULSE OF THE NEGATIVE SLIDER BIAS AT THE DISK SURFACE DEFECT LOCATION TO BURNISH THE DISK SURFACE DEFECT.
415

FIG. 4

NEGATIVE BIASING A SLIDER WITH RESPECT TO A DISK TO REDUCE SLIDER WEAR AND PROVIDE BURNISH RATE CONTROL

BACKGROUND

Hard disk drives are used in almost all computer system operations. In fact, most computing systems are not operational without some type of hard disk drive to store the most basic computing information such as the boot operation, the operating system, the applications, and the like.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

Modern drives often have very narrow tolerances for components and operation of components. Disk drive sliders are designed to fly in very close proximity to the disk surface. For instance, in some systems the slider may be designed to fly only three to five nanometers above the disk surface. In a system with such close tolerances and low slider fly heights, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference (e.g., contact potential difference/difference in work functions) that exists between two different metals (different Fermi levels of slider and disk material); and impacts between the slider and disk surface. In particular, positive slider bias can generate lubrication build up on the slider, which can result in deleterious effects to the hard disk drive.

BRIEF DESCRIPTION OF THE DRAWINGS

The accompanying drawings, which are incorporated in and form a part of this specification, illustrate various embodiments of the present invention and, together with the description of embodiments, serve to explain principles discussed below.

FIG. 4 is a flow diagram of a method for electrostatic biasing slider and disk for burnish rate control, according to one embodiment.

Figure 1:
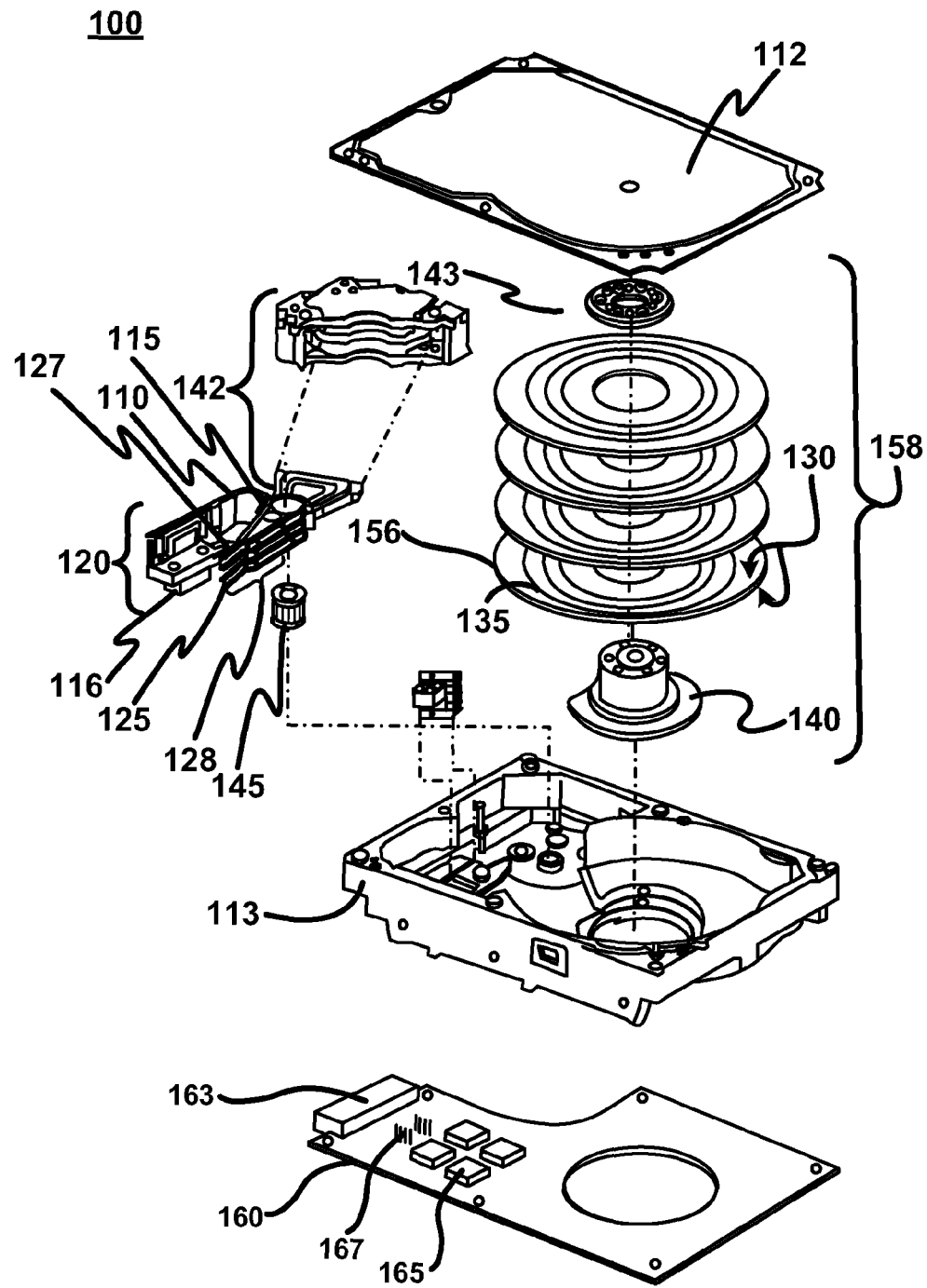
FIG. 1 is an isometric blow-apart of an HDD in accordance with one embodiment.

The drawings referred to in this brief description should be understood as not being drawn to scale unless specifically noted.

DESCRIPTION OF EMBODIMENTS

Reference will now be made in detail to several embodiments of the present invention, examples of which are illustrated in the accompanying drawings. While the embodiments of subject matter discussed herein will be described in conjunction with various embodiments, it will be understood that they are not intended to limit the embodiments of subject matter to these embodiments. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "receiving," "measuring," "feeding back," "providing," "injecting," "utilizing," "controlling," "demodulating," or the like, typically refer to the actions and processes of a hard disk drive, Application Specific Integrated Circuit, hard drive controller, microcontroller, processor, or similar electronic computing device or combination of such devices. The hard disk drive (HDD), microcontroller, arm electronics (AE), front end electronics (FEE), or a similar electronic computing device controls, manipulates, and transforms data and signals represented as physical (electronic) quantities within the HDD's/AE's/FEE's/microcontroller's/electronic device's registers and memories and components, into other data and signals similarly represented as physical quantities within the HDD's/AE's/FEE's/microcontroller's/electronic device's memories or registers or other such information, voltage, signal processing, storage, and/or control components.

Overview of Discussion

Computers have become part of every day life, and as such, expectations and demands continually increase for greater speed for manipulating data and for holding larger amounts of data, while being more compact and consuming less energy. To meet these demands for increased performance, the electromechanical assembly in a computer, specifically the Hard Disk Drive (HDD) has undergone many changes so that more data can be stored in smaller spaces and so that data can be stored and retrieved more quickly and efficiently. One aspect of these changes includes a reduction in the flying height of the head of a slider over the surface of a disk.

As flying heights diminish, slider wear becomes more significant. For example, purposeful head/disk encounters occur when a clearance contact/backoff calibration process is utilized to determine the disk/slider fly height. For example, by increasing the power to a heater coil, the slider protrudes towards the disk surface until it makes contact. The power to the heater coil is then reduced until a desired standoff between the slider and the disk surface is established. However, the contact will cause slider wear. Furthermore, at lower flying heights asperity and intermittent contact may occur leading to head wear and recording degradation. Moreover, contact recording is also limited in lifespan by slider head wear.

One embodiment system and method described herein utilizes electrostatic bias voltage to generate a negative voltage bias between the slider body and the disk to control head wear thereby increasing the lifetime of the interface. As described in more detail herein, by utilizing the negative biasing system and method described herein, the wear occurs at the disk surface instead of the slider head. In one embodiment, it is not necessarily the amount of material being worn away that is being modified. Instead, it is the surface from which the wear is occurring. In other words, the present technology provides a transition from wear occurring at the slider head to wear occurring at the disk surface. This is significant since the disk surface area is much larger than the total surface area of the slider head.

Additionally, the negative slider bias may be utilized for a defect asperity burnishing. In other words, when a localized defect is recognized on the disk, one embodiment may utilize the negative voltage bias to burnish away the localized defect. For example, by applying the negative bias to the slider at the specified defect locations the defect can be gradually worn away. In another embodiment, the negative voltage bias may be increased to the slider at the specified defect locations to increase the speed at which the defect can be worn away.

The discussion will begin with a brief overview of a hard disk drive (HDD) which comprises an electrostatic bias voltage to generate the negative voltage bias between the slider body and the disk to control head wear thereby increasing the lifetime of the interface. Operation of an example HDD having a negative voltage bias between the slider body and the disk to control head will then be described in more detail in conjunction with description of an example method of actively controlling the negative voltage bias. Finally, some example data is presented.

Example Hard Disk Drive

With reference to FIG. 1, an isometric blow-apart of HDD 100 is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, at times referred to as an actuator assembly or carriage, comprises suspension 127, which suspends hard disk drive slider 125 next to disk surface 130, and HSA connector 116. Hard disk drive slider 125 includes one or more magnetic transducers or heads which read data from and write data to data tracks 135. Suspension 127 and hard disk drive slider 125 comprise head gimbal assembly (HGA) 128. Flex cable 110, which is part of HSA 120, conveys data between HSA connector 116 and arm electronics (AE) module 115. AE module 115 controls read and write operations.

HSA 120 is coupled pivotally with base casting 113 by means of pivot bearing 145, such that VCM 142 can move HGA 128 with slider 125 arcuately (in an arc like manner) across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as status check of HDD 100 before writing data, power control for motor-hub assembly 140, and servo control of VCM 142. VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160. It is appreciated that PCB 160 and/or electrical component 165 can be configured in other manners and located in other locations, in other embodiments.

The displayed configuration of HDD 100 is shown by way of example and not of limitation. It is appreciated that in some embodiments, one or more components of HDD 100 can be interchanged or shared between subassemblies while maintaining the spirit of the definitions of the aforementioned assemblies and subassemblies.

Figure 2:
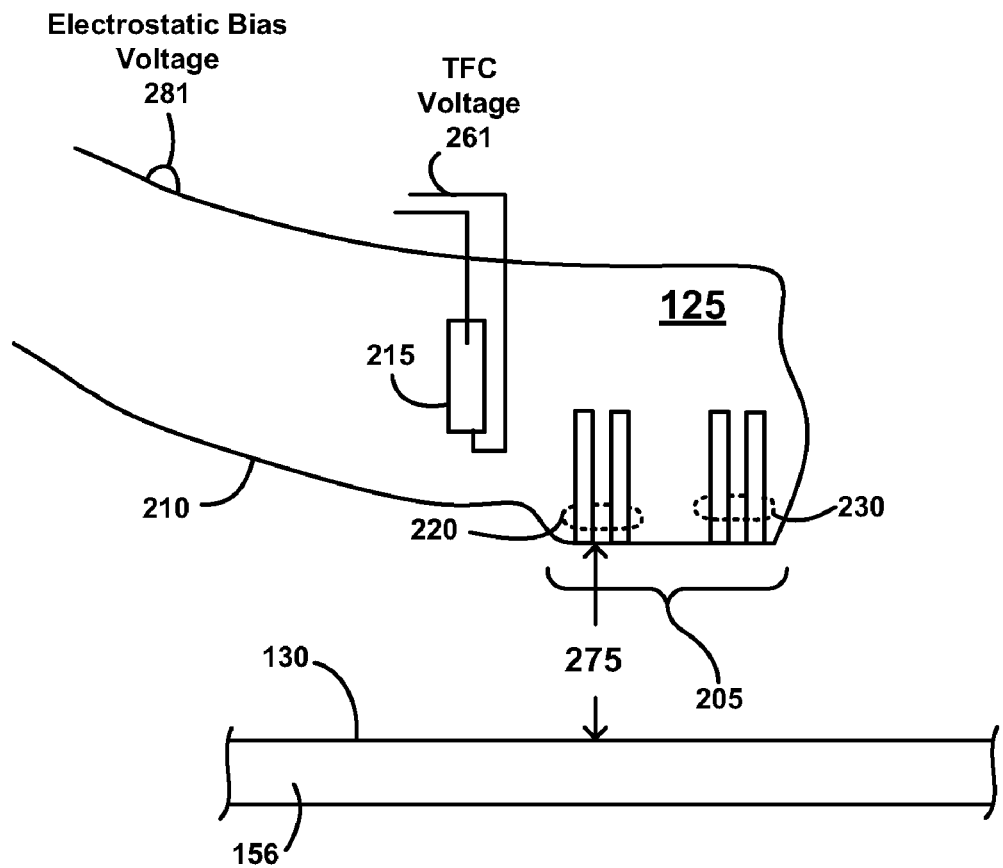
FIG. 2 is a block diagram of an embodiment for providing negative bias between a slider and a disk surface, in accordance with one embodiment.

With reference now to FIG. 2, an example of an embodiment for providing negative bias between a slider 125 and a disk surface 130 is shown. In one embodiment, slider 125 is the same as or similar to slider 125, of FIG. 1. Head regions 205 (often generically referred to as the "head" of slider 125) includes read head 220 and write head 230 which are used to read data from and write data to disk 156. In operation head region 205 is typically placed in close proximity to disk surface 130 during read and write operations. Moreover, head region 205 is typically located on a portion of a slider (e.g., the trailing edge) which is designed to be in the closest proximity to disk surface 130 during flying operation of slider 125 above disk surface 130.

As illustrated in FIG. 2, in one embodiment, TFC voltage 261 is coupled to heater coil 215. In one embodiment, electrostatic bias voltage 281 is coupled to slider body 210. In one embodiment, slider body 210 is isolated from ground. However, in another embodiment, slider body 210 may be grounded. Moreover, it is appreciated that TFC voltage 261 and electrostatic bias voltage 281 can be coupled to slider 125 in this fashion even when other signal injection techniques, signal paths and/or signal lines are utilized with slider 125. In another embodiment, electrostatic bias voltage 281 may be applied through pre-existing signal paths and/or signal lines already utilized with slider 125 including, for example, the ground connection for slider body 210.

In various embodiments, system 200 is implemented as a portion of AE module 115 or front end electronics. This can comprise implementation within an integrated circuit, such as, for example, an Application Specific Integrated Circuit (ASIC). In some embodiments, system 200 is included in a hard disk drive such as HDD 100.

Example Integrated Slider Bias Control System

Figure 3:
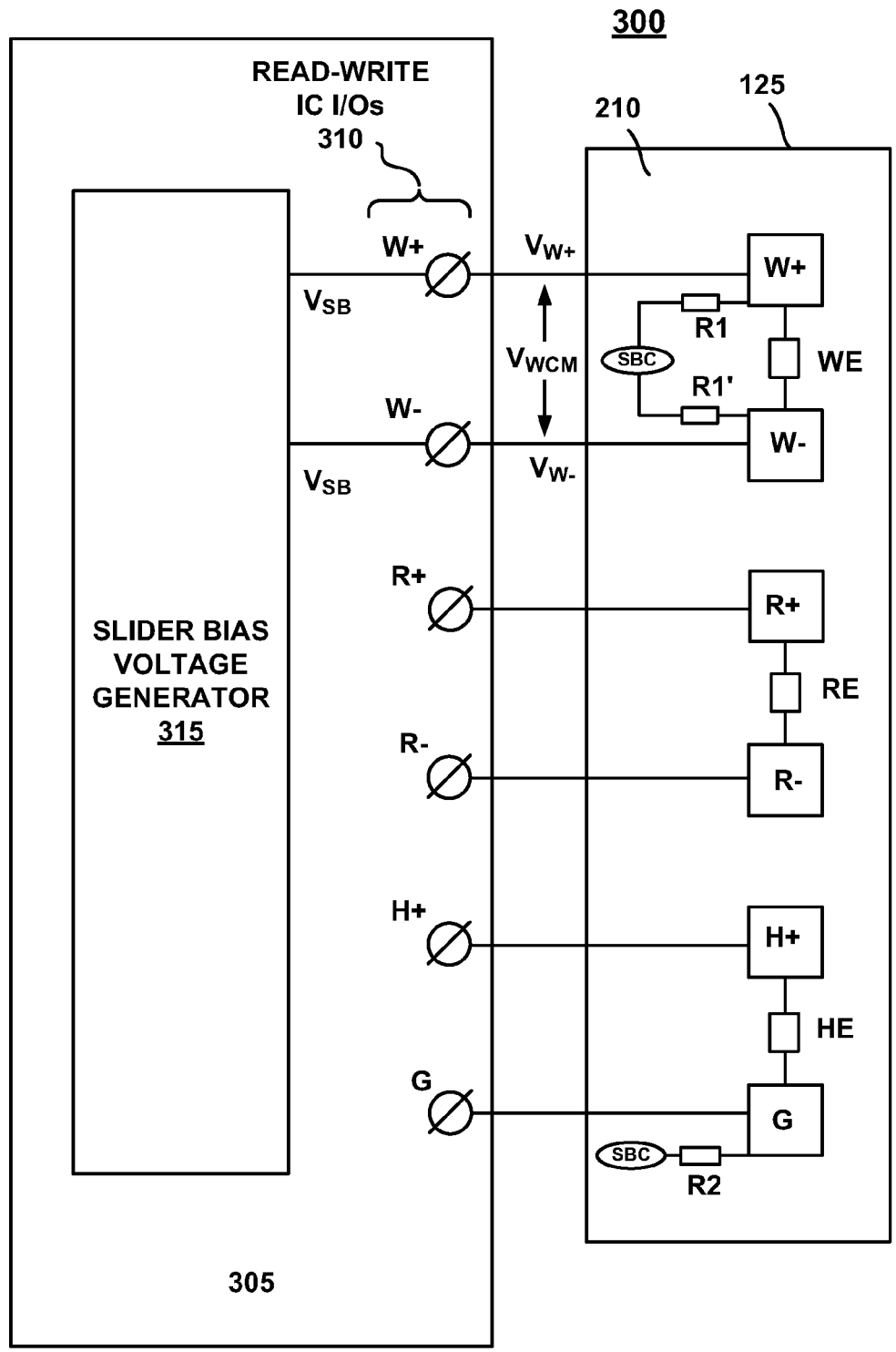
FIG. 3 is block diagram of an example integrated slider bias control system, in accordance with one embodiment.

With reference now to FIG. 3, a block diagram of example integrated slider bias control system is shown in accordance with one embodiment. Diagram 300 includes a slider 125 which has a conductive body 210; a slider bias voltage generator 215 which generates a direct current (DC) bias voltage; and an integrated signal path comprised of an existing signal path on a slider (e.g. slider 125). Although slider bias voltage generator 315 is shown as a portion of read-write integrated circuit (IC) 305, in some embodiments, slider bias voltage generator 315 is located in other portions of a hard disk drive, such as HDD 100. For example, in one embodiment, slider bias voltage generator 315 is included as a portion of PCB 160 for a common slider bias control. Although only one configuration is shown for clarity, it is clear that a plurality of different configurations such as: one or more of slider 125, slider bias voltage generator 315, an RFI attenuation path, and/or the integrated signal path being configured in a slightly different fashion. In one embodiment, the system illustrated in FIG. 3 is included in a hard disk drive, such as HDD 100.

By "existing signal path," what is meant is that a traditionally existing signal path, such as a read path, write path, and/or heater element control path is/are utilized for coupling the bias voltage to slider body 125. While an existing signal path may be slightly modified, such as through the inclusion of components such as a capacitor, a coupling to a slider body connection, and/or a resistor, a separate special purpose signal path for coupling the slider bias voltage from slider bias voltage generator 315 to slider body 125 is not utilized. By "integrated" what is meant is that the existing signal path is primarily used for conveying another signal (e.g., a read data signal, write data signal, or heater element control signal) between the slider and some entity external to the slider. However, at least sometimes, the other signal and a slider bias voltage are conveyed simultaneously, integrated together with one another, on the same signal path within the slider. Thus, this existing signal path may convey the bias voltage to conductive body 210 in an "integral fashion" along with the other signal (e.g., a read data signal, write data signal, or heater element control signal) that is being conveyed to or from the slider on the same signal path. Several examples are illustrated herein and discussed further below.

In FIG. 3, slider 125 comprises a conductive body 210 and includes a write element (WE), read element (RE), and heater element (HE). It is appreciated that RE and WE may be referred to as a read head and write head, respectively; referred to as a "transducer" or "head;" or collectively as "heads." As depicted, a signal path exists between read-write IC 305 and the write element, WE, of slider 125. Additionally, another signal path also exists between read-write IC 305 and the read element, RE, of slider 125.

Read-write IC 305 includes a plurality of read-write IC input/outputs 310. In one embodiment, read-write IC input/outputs 310 comprise pads (for electrical connectivity) which are coupled via signal paths to slider 125. Read-write IC input/outputs 310 include: write+ (W+), write− (W−), read+ (R+), read− (R−); heater element control+ (H+), and ground (G). In other embodiments, read-write IC input/outputs 310 may include additional/different inputs and/or outputs and the return for heater element may be floating to change the ground (G) to return line, H−.

In one embodiment, slider bias voltage generator 315 is shown as part of read-write IC 305. Slider bias voltage generator 315 generates a controllable slider bias voltage, $V_{SB}$, which is a direct current (DC) voltage. In one embodiment, the function of slider bias voltage generator 315 is performed by and incorporated in the write driver of read-write IC 305. In addition to the slider bias voltage, $V_{SB}$, generated by slider bias voltage generator 315, read-write IC 305 generates and receives numerous signals which are coupled between input/outputs 310 of read-write IC 305 and slider 125.

In the embodiment of FIG. 3, slider 125 includes resistive components $R_1$ and $R_{1'}$, which are coupled between a slider body connection, SBC, and each leg of the signal path between write element, WE, and read-write IC 305. This provides a common mode signal path which couples $V_{SB}$ to slider body 125. Additionally, a third resistive element $R_2$ couples the slider body connection, SBC, to the ground line, G, of heater element, HE. With this connection scheme, the write driver's common-mode voltage $V_{WCM}$ is equivalent to $0.5(V_{W−}+V_{W+})$ and can be used to control the potential of slider body 125 with respect to the ground of a HDD system, such as HDD 100 and disk 156 (FIG. 1). With proper resistance matching (e.g., $R_1=R_{1'}$) between $R_1$ and $R_{1'}$, the bias or potential of slider body 125 is expressed as shown in Equation 1:

$$V_{SB} = \frac{V_{WCM} R_2}{\frac{R_1}{2} + R_2} \qquad \text{EQUATION 1}$$

As evident from Equation 1, for resistance values where $R_1 \ll R_2$, the $V_{WCM}$ voltage is equivalent to the $V_{SB}$ voltage. Thus, in some embodiments $R_1$ and $R_{1'}$ are selected to be substantially equivalent (or matched) and also to be very small in comparison to $R_2$. In one embodiment, for example, $R_1$ is selected to be approximately 550Ω or greater with $R_2$ selected to be much larger than $R_1$. For example, in one embodiment $R_2$ is selected to be a factor of ten times larger than the value of $R_1$. When $R_1$ and $R_2$ are selected in this manner, $R_2$ comprises a low frequency high impedance path to ground and $V_{SB}$ is substantially equivalent to $V_{WCM}$.

It is appreciated that write signals and $V_{SB}$ are sometimes both conveyed simultaneously, in an integral fashion, over the existing write signal path between read-write IC 305 and write element, WE, of slider 125. Thus, while the primary purpose of the write signal path between read-write IC 305 and WE of slider 125 is conveying write data signals, this existing signal path is also used, in one embodiment for coupling the slider bias voltage $V_{SB}$ to slider body 125 from read-write IC 305. As such, while writing is taking place, write signals and $V_{SB}$ may be conveyed simultaneously over the write signal path.

Referring now to FIG. 4, a flowchart 400 of a method for electrostatic biasing a slider and disk for burnish rate control is shown in accordance with one embodiment of the present technology. Reference will be made to element shown in FIGS. 1-3 in the description of the method of flow diagram 400.

As stated herein, one embodiment utilizes a thermal fly height control (TFC) voltage 261 to control fly height 275 of slider 125 with respect to the surface 130 of disk 156. For purposes of the present discussion, fly height 275 refers to the distance between slider 125 and disk surface 130. Fly height 275 can be adjusted and/or controlled by TFC voltage 261. In one embodiment, TFC voltage 261 is applied to a heater coil 215 of slider 125. In general, by increasing and decreasing TFC voltage 261 a portion of slider 125 is caused to expand (when the heater coil is excited and heated) and contract (back toward its unexcited/unheated size when voltage is to the heater coil is lowered or removed). For example, when TFC voltage 261 is applied to slider 125 a selected slider 125 altitude (e.g., fly height 275) above disk surface 130 is achieved and maintained. In other words, by adjusting a TFC voltage 261 (up, down, or not at all) the fly height 275 is widened, maintained or reduced.

For example, when TFC voltage 261 is increased the distance between the thermally protruded head of slider 125 to disk surface 130 is decreased. Similarly, when TFC voltage 261 is decreased the distance between the thermally protruded head of slider 125 to disk surface 130 is increased. The expansion and contraction happens very quickly in response to changes in TFC voltage 261, allowing rapid response to feedback.

In one embodiment, the disk/slider fly height 275 is determined utilizing a clearance contact/backoff calibration process. For example, by increasing the power to the heater (TFC) coil, the slider 125 protrudes towards the disk surface 130 and makes contact, which causes slider wear. Furthermore, at lower flying heights 275 asperity and intermittent contact may occur leading to head wear and recording degradation. Moreover, contact recording is also limited in lifespan by slider head wear.

With reference now to 410 of FIG. 4 and to FIG. 2, one embodiment generates a negative voltage bias between the slider 125 and the disk surface 130 respectively, the negative bias voltage causing slider/disk contact wear to occur on the disk surface 130 instead of on the slider 125. In so doing, the wear rate can be significantly reduced thereby increasing the lifetime of the interface. In one embodiment, as described in FIG. 3, generating a slider bias voltage can comprise utilizing a slider bias voltage generator 315 to generate the slider negative bias voltage, VSB.

Although electrostatic bias voltage 281 is shown as being provided to the suspension, the present technology is well suited to having the bias voltage 281 being applied to the disk, the head, or the like. In other embodiments, the voltage could be applied to the common mode reader, common mode writer or the TFC low line—once they have been shunted to the slider body 125.

Figure 5:
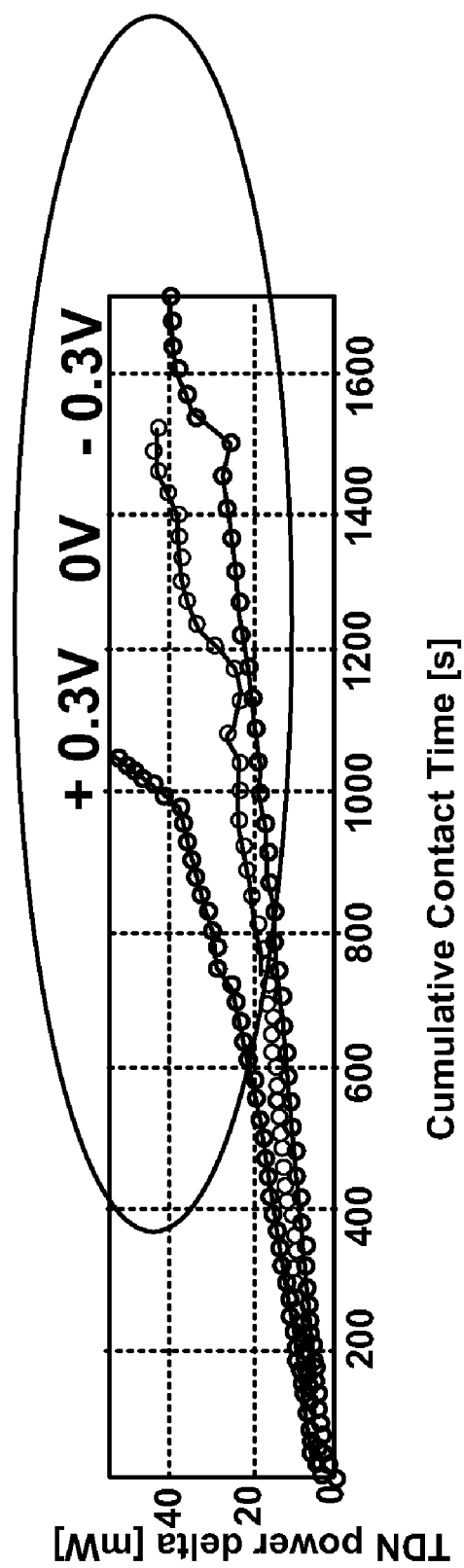
FIG. 5 is a graph of touchdown (TDN) power delta (mW) versus cumulative contact time (s) for a plurality of bias voltages, according to one embodiment.
Figure 6:
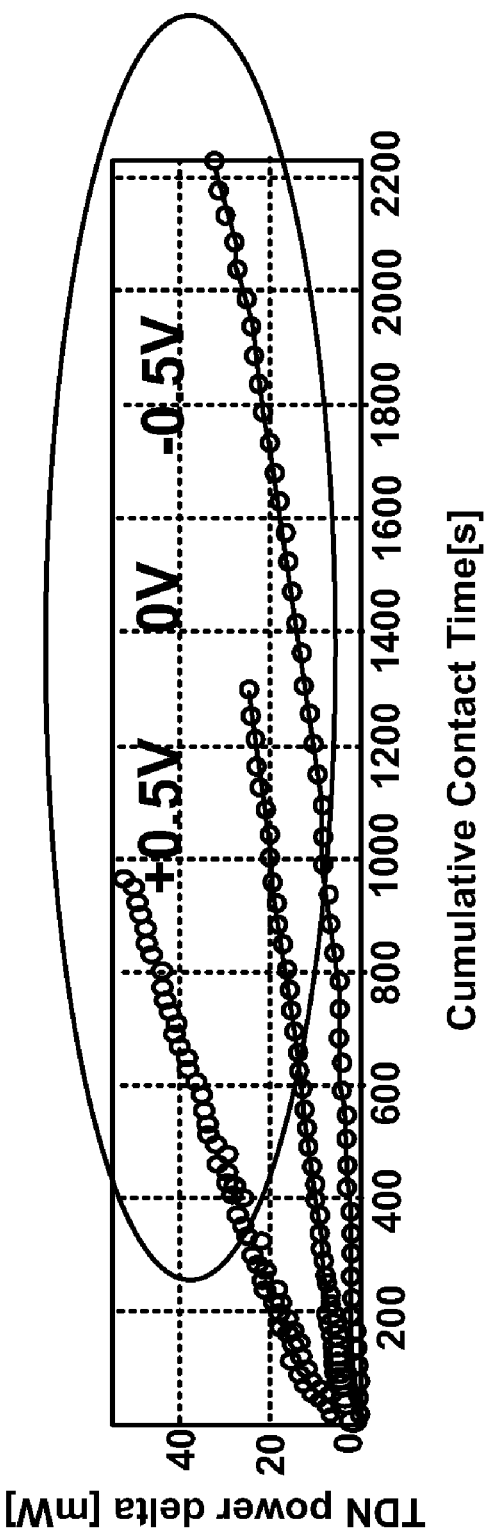
FIG. 6 is a graph of touchdown (TDN) power delta (mW) versus cumulative contact time (s) for a plurality of different bias voltages, according to one embodiment.

For example, as shown in FIGS. 5 and 6, if the disk is grounded and a negative bias is applied to the slider body the slider wear is reduced. In one embodiment, the slider wear is the carbon overcoat on the head. On the other hand, if a positive bias is applied, the head wear is significantly increased. By utilizing the negative biasing system and method described herein, the wear occurs at the disk surface instead of the slider head.

Moreover, it is not necessarily the amount of material being worn away that is being modified herein. Instead, it is the surface from which the wear is occurring. In other words, the present technology provides a transition from wear occurring at the slider head to wear occurring on the disk surface. This is significant since the disk surface area is much larger than the total surface area of the slider head. Moreover, in one embodiment, the wear may be spread across the entire disk surface.

With reference now to 415 of FIG. 4 and to FIG. 2, upon detecting a disk surface defect, one embodiment provides an increased voltage pulse of the negative slider bias at the disk surface defect location to burnish the disk surface defect. In other words, when a defect or asperity is recognized on the disk, one embodiment may utilize the negative voltage bias to burnish away localized defects on the disk. In other words, by applying a pulse, or increase, in the negative bias to the slider at the specified defect location, the defect can be gradually worn away. In another embodiment, the negative voltage bias may be increased to the slider at the specified defect locations to increase the speed at which the defect can be worn away.

For example, in one embodiment a defect detection circuit may be utilized to localize defects. In one embodiment, the sensor is the GMR/TMR head that detects a thermal flash upon asperity contact (TA). Once detected in the next disk revolutions a voltage pulse is applied at the defect location to reduce the asperity height.

It is appreciated that the method of flow diagram 400 can be implemented for a plurality of sliders and disks in a hard disk drive, such as HDD 100, which includes numerous sliders and numerous disks.

With reference now to FIG. 5, a graph of touchdown (TDN) power delta (mW) versus cumulative contact time (s) for a plurality of bias voltages is shown in accordance with one embodiment of the present technology. In general, TDN power delta (mW) refers to the change in the amount of power in mW of TFC voltage 261 that is required to keep the head in contact with the disk surface. As can be seen, the change in applied TFC power ranges from 0 mW to 60 mW. Cumulative contact time (s) refers to the amount of time that the head is in contact with the disk surface. As can be seen, the cumulative contact time ranges from 0 seconds (s) to 1600 (s).

In FIG. 5, three bias voltages are shown. For purposes of clarity herein, the bias is slider to disk. The three graphed values are +0.3V, 0V and −0.3V bias respectively.

As illustrated, 0V bias provides a baseline. As is apparent, the +0.3 V bias requires consistent increases in applied TFC power as the head is worn away over cumulative contact time with a significant spike at approximately 1000 seconds. In one embodiment, the −0.3 V bias requires a much smaller increases in applied TFC power as the disk surface is worn away over cumulative contact time. As shown in FIG. 5, not only does the −0.3 V bias require less increase in applied TFC power to maintain contact between the slider and the disk, but a significant spike does not occur at approximately 1000 seconds. In one embodiment, the significant difference is a direct result of the wear occurring on the much larger disk surface instead of the slider head.

With reference now to FIG. 6, a second graph of touchdown (TDN) power delta (mW) versus cumulative contact time (s) for a plurality of bias voltages is shown in accordance with one embodiment of the present technology. Similar to FIG. 5, TDN power delta (mW) refers to the change in the amount of power in mW of TFC voltage 261 that is required to keep the head in contact with the disk surface. As can be seen, the change in applied TFC power ranges from 0 mW to 60 mW. Cumulative contact time (s) refers to the amount of time that the head is in contact with the disk surface. As can be seen, the cumulative contact time ranges from 0 seconds (s) to 2200 (s).

In FIG. 6, three larger bias voltages are shown. For purposes of clarity herein, the bias is slider to disk. The three graphed values are +0.5V, 0V and −0.5V bias respectively.

As illustrated, 0V bias provides a baseline. As is apparent, the +0.5 V bias requires consistent increases in applied TFC power as the head is worn away over cumulative contact time with a significant spike at just prior to approximately 1000 seconds. In one embodiment, the −0.5 V bias requires a much smaller increases in applied TFC power as the disk surface is worn away over cumulative contact time. As shown in FIG. 6, not only does the −0.5 V bias require less increase in applied TFC power to maintain contact between the slider and the disk, but a significant spike does not occur at approximately 1000 seconds or at any time throughout the 2200 seconds of cumulative contact. In one embodiment, the significant difference is a direct result of the wear occurring on the much larger disk surface instead of the slider head.

Example embodiments of the present invention are thus described. Although the embodiments of the present invention have been described in a language specific to structural features and/or methodological acts, it is to be understood that the embodiments of the present invention defined in the appended claims are not necessarily limited to the specific features or acts described above. Rather, the specific features and acts described above are disclosed as example forms of implementing the claims.

What is claimed is:

1. A method for negatively biasing a slider with respect to a disk to reduce slider wear and provide burnish rate control, said method comprising:
    utilizing a thermal fly height control (TFC) voltage to control fly height of a slider with respect to a surface of a disk; and
    generating a negative bias voltage between said slider and said disk surface respectively, said negative bias voltage causing slider/disk contact wear to occur on said disk instead of on said slider.

2. The method as recited in claim 1, further comprising:
    upon detecting a surface defect on said disk, providing an increased voltage pulse of the negative slider bias at a location of the disk surface defect to burnish the disk surface defect.

3. The method as recited in claim 1, further comprising:
    applying a voltage at a location to generate the negative bias voltage between said slider and said disk, wherein the location is selected from a group consisting of: slider and disk.

4. The method as recited in claim 1, further comprising:
    utilizing a predetermined negative bias voltage value.

5. The method as recited in claim 1, further comprising:
    utilizing an existing signal path of said slider for providing said negative bias voltage, wherein said existing signal path is primarily used for conveying another signal to or from said slider but at least sometimes conveys said negative bias voltage.

6. The method as recited in claim 5, further comprising:
    utilizing a heater element signal path of said slider for providing said negative bias voltage.

7. The method as recited in claim 5, further comprising:
    utilizing a read/write line signal path of said slider for providing said negative bias voltage.

8. The method as recited in claim 5, further comprising:
    utilizing a ground signal path for providing said negative bias voltage.

9. A negatively biasing slider system comprising:
    a bias voltage generator providing a negative bias voltage between a slider and a disk surface respectively, said negative bias voltage causing slider/disk contact wear to occur on said disk instead of on said slider;
    a surface defect detector configured to detect surface defects on a disk, and
    an in-drive burnisher providing a signal to said bias voltage generator to provide an increased voltage pulse of the negative slider bias at a location of the disk surface defect to burnish the disk surface defect.

10. The negatively biasing slider system of claim 9, wherein said bias voltage generator applies a voltage at the slider to generate the negative bias voltage between said slider and said disk.

11. The negatively biasing slider system of claim 9, wherein said bias voltage generator applies a voltage at the disk to generate the negative bias voltage between said slider and said disk.

12. The negatively biasing slider system of claim 9, wherein said bias voltage generator utilizes a predetermined negative bias voltage value.

13. The negatively biasing slider system of claim 9, wherein said bias voltage generator utilizes an existing signal path of said slider for providing said negative bias voltage, wherein said existing signal path is primarily used for conveying another signal to or from said slider but at least sometimes conveys said negative bias voltage.

14. The negatively biasing slider system of claim 9, wherein said bias voltage generator utilizes a heater element signal path of said slider for providing said negative bias voltage.

15. The negatively biasing slider system of claim 9, wherein said bias voltage generator utilizes a ground signal path for providing said negative bias voltage.

16. A hard disk drive comprising:
    a disk comprising a surface for magnetic storage of data;
    a slider having a head and a signal path to said head, said slider configured for moving across said surface for writing and reading of said data; and
    a negatively biasing slider system comprising:
        a thermal fly height control (TFC) voltage to control fly height of a slider with respect to a surface of a disk;
        a bias voltage generator providing a negative bias voltage between a slider and a disk surface respectively, said negative bias voltage causing slider/disk contact wear to occur on said disk instead of on said slider;
        a surface defect detector configured to detect surface defects on a disk, and
        an in-drive burnisher providing a signal to said bias voltage generator to provide an increased voltage pulse of the negative slider bias at a location of the disk surface defect to burnish the disk surface defect.

17. The hard disk drive of claim 16, wherein said bias voltage generator applies a voltage at the slider to generate the negative bias voltage between said slider and said disk.

18. The hard disk drive of claim 16, wherein said bias voltage generator applies a voltage at the disk to generate the negative bias voltage between said slider and said disk.

19. The hard disk drive of claim 16, wherein said bias voltage generator utilizes a predetermined negative bias voltage value.

20. The hard disk drive of claim 16, wherein said bias voltage generator utilizes a ground signal path for providing said negative bias voltage.

* * * * *